(12) United States Patent
Baker

(10) Patent No.: US 9,283,889 B1
(45) Date of Patent: Mar. 15, 2016

(54) LICENSE PLATE FRAME WITH EMERGENCY LIGHTING

(71) Applicant: Monsour M. Baker, Orlando, FL (US)

(72) Inventor: Monsour M. Baker, Orlando, FL (US)

( * ) Notice: Subject to any disclaimer, the term of this patent is extended or adjusted under 35 U.S.C. 154(b) by 76 days.

(21) Appl. No.: 13/917,635

(22) Filed: Jun. 13, 2013

Related U.S. Application Data

(63) Continuation-in-part of application No. 13/657,641, filed on Oct. 22, 2012, now abandoned.

(60) Provisional application No. 61/583,851, filed on Jan. 6, 2012.

(51) Int. Cl.
*B60Q 1/56* (2006.01)

(52) U.S. Cl.
CPC ........................................ *B60Q 1/56* (2013.01)

(58) Field of Classification Search
CPC ............. B60Q 1/24; B60Q 1/56; F21S 48/00; B60R 13/105; G09F 2013/044; G09F 2013/0445
See application file for complete search history.

(56) References Cited

U.S. PATENT DOCUMENTS

| | | | | |
|---|---|---|---|---|
| 1,798,483 | A * | 3/1931 | Moore | 40/205 |
| 1,807,246 | A * | 5/1931 | Mauro | 40/204 |
| 4,857,890 | A * | 8/1989 | Solow | 340/479 |
| 5,029,053 | A * | 7/1991 | Solow | 362/497 |
| 5,408,772 | A * | 4/1995 | Pettyjohn | 40/204 |
| 5,412,887 | A * | 5/1995 | Layne | 40/714 |
| 6,027,235 | A * | 2/2000 | Chen | 362/497 |
| 8,657,463 | B2 * | 2/2014 | Lichten et al. | 362/231 |
| 2004/0114391 | A1 * | 6/2004 | Watkins et al. | 362/542 |
| 2007/0245607 | A1 * | 10/2007 | Awai et al. | 40/546 |

* cited by examiner

*Primary Examiner* — Evan Dzierzynski
(74) *Attorney, Agent, or Firm* — Allen Dyer Doppelt Milbrath & Gilchrist

(57) ABSTRACT

A license plate frame assembly a housing and a first plurality of lighting elements. The housing is adapted for mounting to a vehicle and has first and second generally opposed pairs of side members defining a central aperture dimensioned for a vehicle license plate to be visible therethrough. Each of the first pair of side members defines a first plurality of lighting element apertures therein. The first plurality of lighting elements is arranged in the housing under the first plurality of lighting element apertures, and mounted in the housing such that light emitted thereby from the first pair of side members is oriented along intersecting first axes at acute angles relative to a plane of the vehicle license plate.

19 Claims, 2 Drawing Sheets

LICENSE PLATE FRAME WITH EMERGENCY LIGHTING

CROSS-REFERENCE TO RELATED APPLICATIONS

This application is a continuation-in-part of U.S. Nonprovisional patent application Ser. No. 13/657,641, filed on Oct. 22, 2012, which claims the benefit of U.S. Provisional Patent Application Ser. No. 61/583,851, filed on Jan. 6, 2012, and U.S. Provisional Patent Application Ser. No. 61/550,093, filed on Oct. 21, 2011, the contents of which application are herein incorporated by reference in their entirety.

FIELD OF THE INVENTION

The present invention relates to vehicle emergency lighting, and more particularly, to emergency lighting placed in the vicinity of the vehicle license plate.

BACKGROUND OF THE INVENTION

To enhance the visibility, and hence safety and effectiveness, of many emergency and public service vehicles, emergency lighting is employed on various portions of the vehicle. Some attempts have been made to place emergency lighting in the vicinity of the vehicle license plate—particularly the rear license plate—although further improvements to emergency lighting placement in this key location are possible.

SUMMARY OF THE INVENTION

In view of the foregoing, it is an object of the present invention to provide a license plate frame with emergency lighting. Advantageously, emergency lighting elements are integrated into the license plate frame, which is dimensioned to fit around standard license plate sizes. To increase the field of view of the emergency lighting, the emergency lighting elements along sides of the license plate are arranged at non-perpendicular angles to the plane of the license plate to generate a wider field of view.

The emergency lighting elements can include light emitting diodes (LEDs) and corresponding optics. The frame can be formed of front and back plates, with the optics mounted to the front plate and the LEDs mounted to the back plate in alignment with the optics. Control and power electronics can be located within the plate frame and/or separately located. Advantageously, the frame can be fabricated from aluminum or other heat conductive material to serve as heat sink for higher power LEDs and other heat generating electronic components.

According to an embodiment of the present invention, a license plate frame assembly a housing and a first plurality of lighting elements. The housing is adapted for mounting to a vehicle and has first and second generally opposed pairs of side members defining a central aperture dimensioned for a vehicle license plate to be visible therethrough. Each of the first pair of side members defines a first plurality of lighting element apertures therein. The first plurality of lighting elements is arranged in the housing under the first plurality of lighting element apertures, and mounted in the housing such that light emitted thereby from the first pair of side members is oriented along intersecting first axes at acute angles relative to a plane of the vehicle license plate.

These and other objects, aspects and advantages of the present invention will be better appreciated in view of the drawings and detailed description of a preferred embodiment.

DETAILED DESCRIPTION OF PREFERRED EMBODIMENTS

Figure 1:
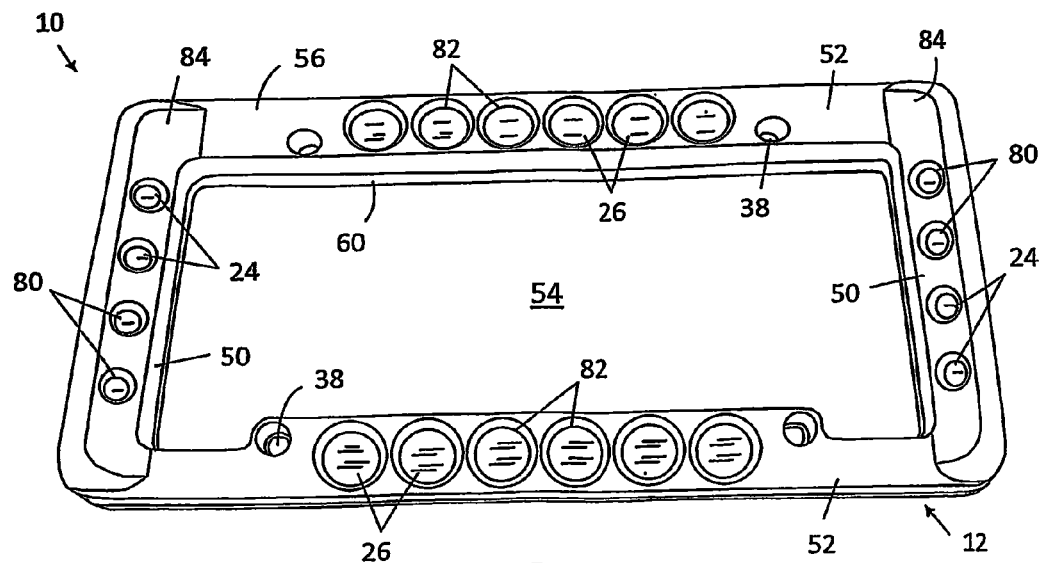
FIG. 1 is a front perspective view of a license plate frame assembly, according to an embodiment of the present invention.
Figure 2:
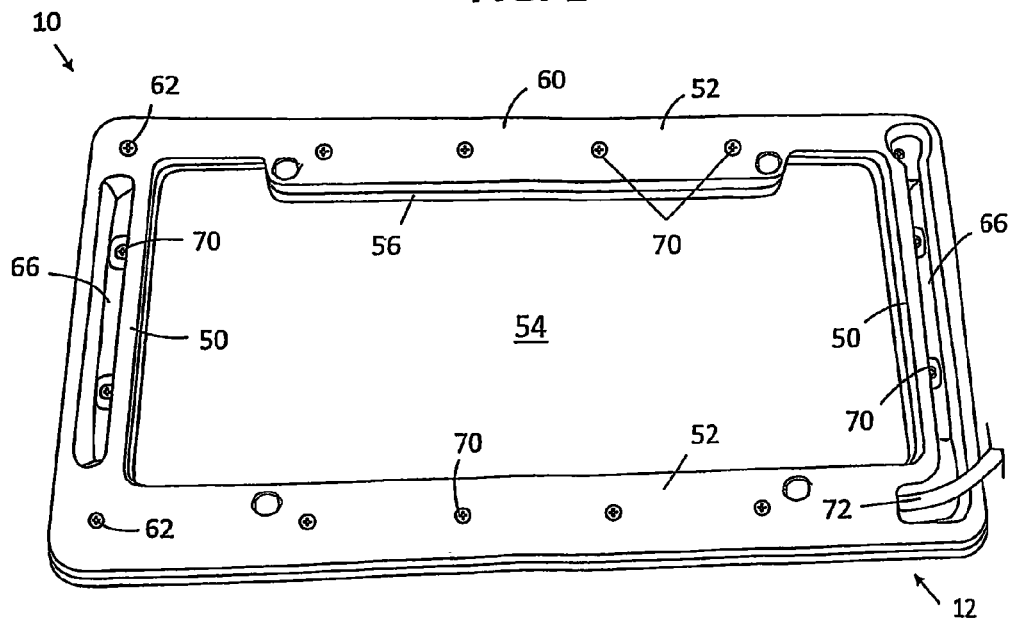
FIG. 2 is a rear perspective view of the license plate frame assembly of FIG. 1.
Figure 3:
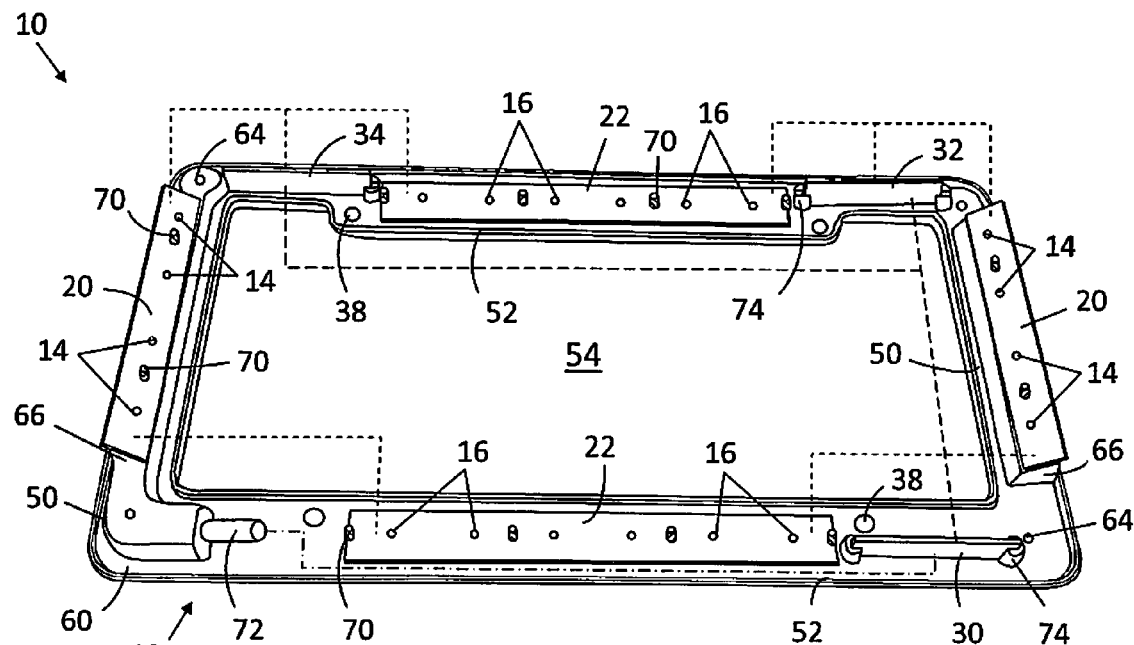
FIG. 3 is a front perspective view of the license plate frame assembly of FIG. 1, with a front housing section removed to show internal details and electrical connections illustrated schematically in broken lines.

According to an embodiment of the present invention, referring to FIGS. 1-3, a license plate frame assembly 10 includes a housing 12 holding first and second pluralities of lighting elements 14, 16, which are respectively mounted on first and second pairs of lighting element circuit boards 20, 22 and respectively covered by first and second pluralities of lenses 24, 26. The lighting elements 14, 16 are preferably light emitting diodes (LED) and are powered via a LED controller board 30 via first and second LED driver boards 32, 34.

Figure 4:
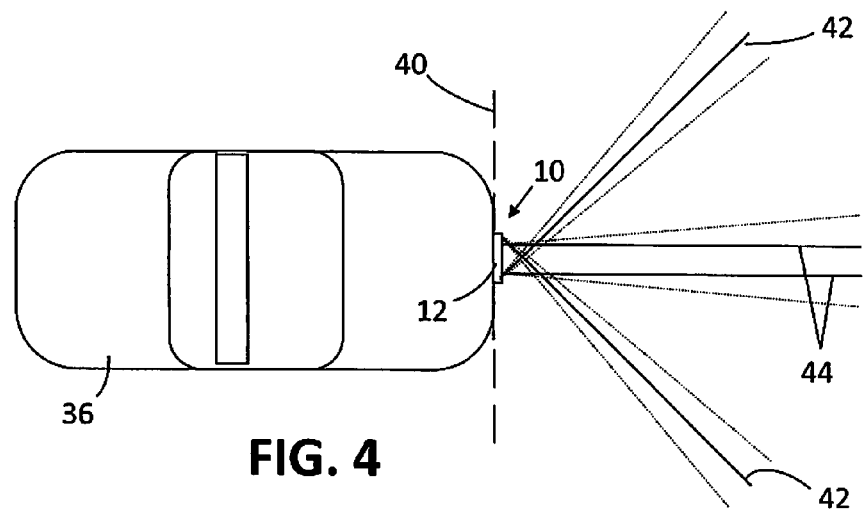
FIG. 4 is top schematic view of a vehicle equipped with the license plate frame assembly of FIG. 1, showing approximate orientations of emitted light relative a license plate plane.

Also referring to FIG. 4, the housing 12 is adapted for mounting to a vehicle 36, for instance via mounting holes 38. For referential purposes, when the license plate frame assembly is mounted to the vehicle, a license plate plane is represented in one dimension by the line 40, with its second dimension extending into and out of the page. The first plurality of lighting elements 14 are mounted in the housing 12 such that light emitted thereby is oriented along intersecting first axes 42 at acute angles relative to the license plate plane, most preferably approximately forty-five (45) degree angles. The second plurality of lighting elements are mounted in the housing 12 such that light emitted thereby is oriented along second axes 44 approximately perpendicular to the license plate plane.

Referring again to FIGS. 1-3, the housing 12 has first and second opposed pairs of side members 50, 52 that define a central aperture 54. The central aperture is dimensioned for a vehicle license plate to be visible therethrough. The housing 12 is preferably made of aluminum front and back sections with an automotive-grade powder coated black finish for durability and stealth installation. Preferred dimensions of 12.375"×6.375"×1.3/16" allow a universal fit for all 12"×6" North and South American License Plates.

Advantageously, the housing 12 is made from connected front and back housing sections 56, 60, such that the first and second pairs of side members 50, 52 each have respective front and back portions. The sections 56, 60 are connected by a plurality of housing fasteners 62 threaded through holes 64. Preferably, the junction between sections 56, 60, as well as all holes or other openings thereinto, are suitably sealed so as to resist the introduction of moisture and/or dirt into the housing 12.

The back portions of the first pair of side members 50 are formed with angled mounting surfaces 66, on which the first LED circuit boards 20 are directly mounted so as to orient the LEDs 14 at the desired angle. The second LED circuit boards 22 are mounted directly mounted to the back portions of the second pair of side members 52. Thus, the aluminum structure of the housing 12, and more particularly the back housing section 60, can serve as a heat sink for the LEDs 14, 16. Proper alignment of the LEDs 14, 16 is facilitated by mounting the circuit boards 20, 22 using fasteners 70 threaded through pre-formed aligned openings in the back housing section 60 and the boards 20, 22.

Power and command inputs are introduced into the housing 12 via a cable 72, routed through a sealed opening thereinto. The cable 72 connects to the LED controller board 30, which selectively supplies power the LED driver boards 32, which in turn supply power to the LED boards 20, 22. The emergency lighting elements can advantageously be controlled to give multiple flash patterns. The connections between the circuit boards are depicted schematically, and it should be appreciated that all wiring and connections are made internally to the housing 12. Preferably, the controller and driver boards 30, 32 are mounted between the front and back housing sections 56, 60, and proper placement is facilitated by notched posts 74.

The lenses 24, 26 are arranged in respective first and second pluralities of lighting element apertures 80, 82, defined in the first and second pairs of side elements 50, 52. The lenses 24, 26 can be used to better focus or distribute visible output of the LEDs 14, 16 in or about a desired orientation, although "lens" as used herein can encompass a blank lens that simply lets light pass with little or no convergence or divergence. The first plurality of lenses 24 and the first plurality of apertures 80 are preferably located in inclined surfaces 84 of the front housing section 56, which inclined surfaces 84 overlie the angled mounting surfaces 66 of the back housing section 60.

It will be appreciated that the foregoing license plate frame assembly 10 offers a compact and reliable means for greatly increasing visibility from the rear (and/or front) of an emergency vehicle, while being relatively easy to install and minimally impacting the unlighted appearance of the vehicle. Additionally, features of the frame assembly 10 allow for quick and reliable manufacture, as well as significant durability when in use.

The above embodiment is provided for exemplary and illustrative purposes. Those skilled in the art will appreciate that the present invention is not necessarily limited to such an embodiment. Rather, numerous modifications, and adaptations for particular circumstances, fall within the scope of the invention as herein shown and described and of the claims appended hereto.

What is claimed is:

1. A license plate frame assembly comprising:
   a housing for mounting to a vehicle, the housing having first and second generally opposed pairs of side members defining a central aperture dimensioned for a vehicle license plate lying in a vehicle license plate plane to be visible therethrough, each of the first pair of side members defining a first plurality of lighting element apertures therein;
   a first plurality of lighting elements arranged in the housing under the first plurality of lighting element apertures;
   wherein each of the first pair of side members includes an inclined surface in which the first plurality of lighting element apertures are defined, the inclined surface forming an acute angle with respect to the vehicle license plate plane; and
   wherein the first plurality of lighting elements are mounted in the housing such that light emitted thereby through the first plurality of lighting element apertures is oriented along first axes at acute angles relative to the vehicle license plate plane.

2. The license plate frame assembly of claim 1, wherein the first pair of side members define shorter sides of the central aperture than the second pair of side members.

3. The license plate frame assembly of claim 1, wherein, when mounted to the vehicle, the first pair of side members define left and right sides of the central aperture and the second pair of side members define top and bottom sides of the central aperture.

4. The license plate frame assembly of claim 1, wherein each of the acute angles is approximately 45 degrees.

5. The license plate frame assembly of claim 1, wherein each of the second pair of side members defines a second plurality of lighting element apertures therein, and the license plate frame assembly further comprises a second plurality of lighting elements arranged in the housing under the second plurality of lighting element apertures.

6. The license plate frame assembly of claim 5, wherein the second plurality of lighting elements are mounted in the housing such that light emitted thereby from the second pair of side members is oriented along second axes at acute angles approximately perpendicular to the plane of the vehicle license plate when arranged to be visible through the central aperture.

7. The license plate frame assembly of claim 1, wherein the housing includes connected front and back housing sections forming respective first and second front and back portions of the first and second pairs of sides, the first plurality of lighting element apertures being defined in the front housing section.

8. The license plate frame assembly of claim 7, further comprising a first pair of lighting element circuit boards to which the first plurality of lighting elements are mounted, the first pair of lighting element circuit boards being connected to the back housing section.

9. The license plate frame assembly of claim 8, wherein an angled mounting surface with respect to the vehicle license plate plane is formed on each of the first back portions extending toward the first front portions, the first pair of lighting element circuit boards being mounted on the angled mounting surfaces.

10. The license plate frame assembly of claim 9, wherein each of the first front portions includes an inclined surface in which the first plurality of lighting element apertures are defined, the inclined surfaces overlying the angled mounting surfaces.

11. The license plate frame assembly of claim 8, wherein the back housing section is made of aluminum and thermally coupled to the first pair of lighting element circuit boards so as to function as a heat sink for the first plurality of lighting elements.

12. The license plate frame assembly of claim 1, further comprising a first plurality of lenses mounted in the first plurality of lighting element apertures overlying the first plurality of lighting elements.

13. The license plate frame assembly of claim 1, further comprising:
   a first pair of lighting element circuit boards to which the first plurality of lighting elements are mounted; and
   at least one lighting element driver circuit board electrically connected to the first pair of circuit boards and operable to supply electrical power thereto;
   wherein the first pair of circuit boards and the at least one lighting element driver circuit board are mounted inside the housing.

14. The license plate frame assembly of claim 13, wherein the first plurality of lighting elements are light emitting diodes.

15. The license plate frame assembly of claim 13, further comprising at least one lighting element controller circuit board mounted inside the housing and operable to control the supply of electrical power to the first pair of lighting element circuit boards via the at least one lighting element driver circuit board.

16. A license plate frame assembly comprising:
a housing for mounting to a vehicle, the housing having
first and second generally opposed pairs of side members defining a central aperture dimensioned for a vehicle license plate lying in a vehicle license plate plane to be visible therethrough,
connected front and back housing sections forming respective first and second front and back portions of the first and second pairs of sides, the first front portions having inclined surfaces in which a first plurality of lighting element apertures are defined, the back portions having angled mounting surfaces underlying the inclined surfaces, the inclined surfaces and angled mounting surfaces being inclined relative to the vehicle license plate plane;
a first plurality of lenses mounted in the first plurality of lighting element apertures;
a first plurality of lighting elements underlying the first plurality of lenses; and
a first pair of lighting element circuit boards carrying the first plurality of lighting elements and mounted to the angled mounting surfaces;
wherein the first plurality of lighting elements are mounted in the housing such that light emitted thereby through the first plurality of lighting element apertures is oriented along first axes at acute angles relative to the vehicle license plate plane.

17. The license plate frame assembly of claim 16, wherein a second plurality of lighting element apertures are defined in the second front portions, the license plate frame assembly further comprising:
a second plurality of lenses mounted in the second plurality of lighting element apertures;
a second plurality of lighting elements underlying the second plurality of lenses; and
a second pair of lighting element circuit boards carrying the second plurality of lighting elements and mounted to the second back portions.

18. The license plate frame assembly of claim 17, wherein each of the acute angles is approximately 45 degrees; and
wherein the second plurality of lighting elements are mounted in the housing such that light emitted thereby from the second pair of side members is oriented along second axes at an angle approximately perpendicular to a plane of the vehicle license plate when arranged to be visible through the central aperture.

19. The license plate frame assembly of claim 17, further comprising:
at least one lighting element driver circuit board electrically connected to the first and second pairs of circuit boards and operable to supply electrical power thereto; and
at least one lighting element controller circuit board operable to control the supply of electrical power to the first and second pairs of lighting element circuit boards via the at least one lighting element driver circuit board;
wherein the at least one lighting element driver circuit board and the at least one lighting element controller circuit board are mounted between the front and back housing sections.

\* \* \* \* \*